(12) United States Patent
Lips

(10) Patent No.: US 12,523,381 B2
(45) Date of Patent: Jan. 13, 2026

(54) AIR CONDITIONING DEVICE WITH INDIRECT COOLING BY EVAPORATION

(71) Applicant: CAELI ENERGIE, Meylan (FR)

(72) Inventor: Stéphane Lips, Seyssins (FR)

(73) Assignee: CAELI ENERGIE, Meylan (FR)

( * ) Notice: Subject to any disclaimer, the term of this patent is extended or adjusted under 35 U.S.C. 154(b) by 215 days.

(21) Appl. No.: 18/548,905

(22) PCT Filed: Mar. 3, 2022

(86) PCT No.: PCT/EP2022/055490
§ 371 (c)(1),
(2) Date: Sep. 3, 2023

(87) PCT Pub. No.: WO2022/184871
PCT Pub. Date: Sep. 9, 2022

(65) Prior Publication Data
US 2024/0167705 A1 May 23, 2024

(30) Foreign Application Priority Data
Mar. 4, 2021 (FR) .................................. FR2102107

(51) Int. Cl.
*F24F 5/00* (2006.01)
*F24F 3/14* (2006.01)
*F28D 5/02* (2006.01)

(52) U.S. Cl.
CPC .......... *F24F 5/0035* (2013.01); *F24F 3/1411* (2013.01); *F28D 5/02* (2013.01)

(58) Field of Classification Search
CPC .......... F24F 5/0035; F24F 3/1411; F28D 5/02
See application file for complete search history.

(56) References Cited

U.S. PATENT DOCUMENTS

| 4,398,596 A | 8/1983 | Lauro et al. |
| 2005/0210907 A1* | 9/2005 | Gillan ............... F24F 1/0007 62/304 |

FOREIGN PATENT DOCUMENTS

| EP | 3262365 A1 | 1/2018 |
| EP | 3191782 B1 | 11/2020 |

(Continued)

OTHER PUBLICATIONS

International Search Report for International Application No. PCT/EP2022/055490, mailed May 16, 2022, 5 pages with English translation.

(Continued)

*Primary Examiner* — Cassey D Bauer
(74) *Attorney, Agent, or Firm* — TraskBritt

(57) ABSTRACT

An indirect evaporative cooling air-conditioning device, for blowing cooled air into a room, includes an air intake, for collecting air to be cooled; a plurality of plates forming a stack; and a ventilation system. Each plate has a dry face opposite a wet face, which is to be kept wet with water. Each plate is intended to be cooled by water evaporation from the wet face. Two adjacent plates are spaced from each other, along a transverse axis, to form a channel, either dry or wet. A dry channel is delimited by two dry faces of the adjacent plates. A wet channel is delimited by two wet faces of the adjacent plates. Each wet channel includes several wet outlets distributed along a lateral axis, and/or each dry channel includes several air inlets distributed along the lateral axis, which is perpendicular to a longitudinal axis and to the transverse axis.

20 Claims, 10 Drawing Sheets

(56) References Cited

FOREIGN PATENT DOCUMENTS

| WO | 02/27254 A2 | 4/2002 |
| WO | 02/027254 A3 | 4/2002 |
| WO | 2005/090869 A1 | 9/2005 |
| WO | 2016/134417 A1 | 9/2016 |

OTHER PUBLICATIONS

International Written Opinion for International Application No. PCT/EP2022/055490, mailed May 16, 2022, 18 pages with English machine translation.

* cited by examiner

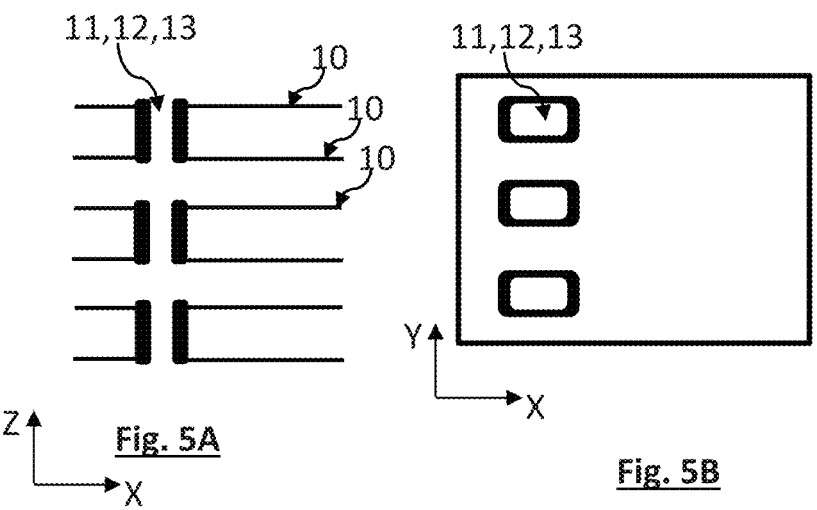
Fig. 5A
Fig. 5B
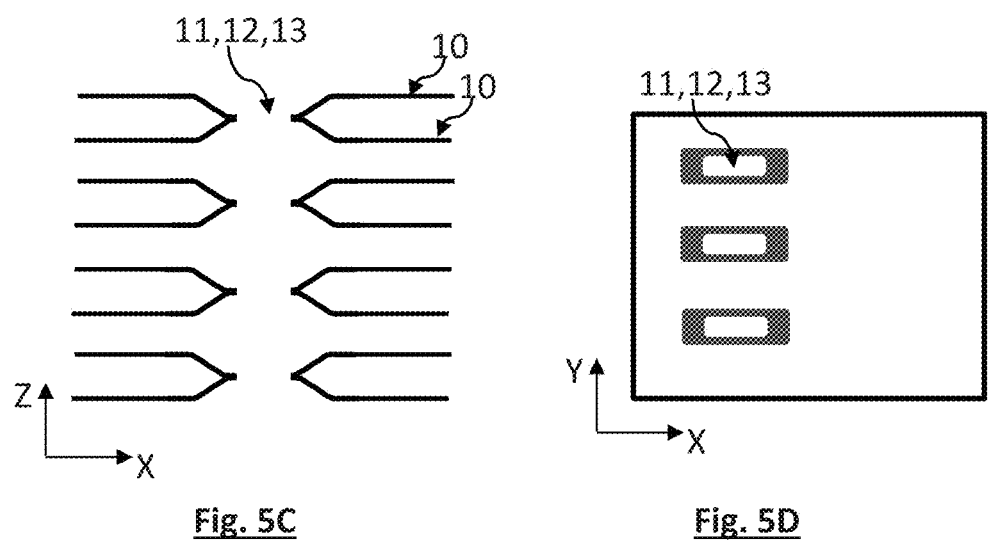
Fig. 5C
Fig. 5D

AIR CONDITIONING DEVICE WITH INDIRECT COOLING BY EVAPORATION

CROSS REFERENCE TO RELATED APPLICATIONS

This application is a national phase entry under 35 U.S.C. § 371 of International Patent Application PCT/EP2022/055490, filed Mar. 3, 2022, designating the United States of America and published as International Patent Publication WO 2022/184871 A1 on Sep. 9, 2022, which claims the benefit under Article 8 of the Patent Cooperation Treaty to French Patent Application Serial No. FR2102107, filed Mar. 4, 2021.

TECHNICAL FIELD

The technical field of the disclosure is a device for cooling air by indirect evaporative cooling.

BACKGROUND

Air coolers that use indirect evaporative cooling, also referred to as dew point indirect adiabatic coolers, have been known for several decades.

The principle of operation of such coolers is indicated schematically in FIG. 1. It is based on the use of an evaporator-exchanger, in which the incoming air (arrow F1 in solid line in FIG. 1) is cooled, without humidification, potentially down to its dew point. The cooling is produced by a circulation of air in contact with a plate P1, referred to as cooling plate, which is cooled by the evaporation of water. The cooling plate has a dry face, in contact with which the air that is to be cooled flows, and a wet face, wetted with water, the water being symbolized by circles in FIG. 1. In FIG. 1, the chain-line arrows represent air that has been cooled or that is in the process of being cooled.

A fraction of the cooled air, in contact with the dry face of the cooling plate, is discharged, so as to cool a room: arrow F2. Another fraction of the cooled air is re-injected into the cooler and directed in such a way that it flows in contact with the wet face of the cooling plate: arrow F3. The air thus re-injected warms up, evaporating the water present on the wet face of the cooling plate. This results in the lowering of the temperature of the cooling plate. The air thus warmed, laden with moisture, is then discharged to outside the room.

Compared with the most widespread air conditioning devices, a notable advantage offered by such coolers is the absence of refrigerant. These devices need to be supplied only with water. This means that they have a more favorable environmental impact than the conventional air conditioning units, which are based on the compression of a refrigerant. It is known that refrigerants may have harmful effects on the environment.

Examples of indirect evaporative cooling devices have been described in EP3191782 or EP3262365.

BRIEF SUMMARY

According to embodiments of the disclosure, proposed is an optimized indirect evaporative cooling device that offers a good compromise between effectiveness and compactness.

A first subject of the disclosure is an indirect evaporative cooling air-conditioning device, the device being intended to blow cooled air into a room, the device comprising:

an air intake, intended to collect air that is to be cooled;
a plurality of plates, forming a stack, each plate having a dry face opposite to a wet face, the wet face of each plate being configured to be wetted with water, each plate being intended to be cooled under the effect of evaporation of water from the wet face; and
a ventilation system;
the device being such that:
two adjacent plates are spaced away from one another, along a transverse axis so as to form a channel, the channel being either:
  a dry channel, delimited by two dry faces of two adjacent plates, or
  a wet channel, delimited by two wet faces of two adjacent plates;
the plates are arranged in such a way as to form an alternation of dry channels and wet channels, each dry channel being adjacent to a wet channel, two adjacent channels, respectively one dry and one wet, being connected by a fluid junction;
each dry channel extends, along a longitudinal axis, between an air inlet, connected to the air intake, and a cold outlet, the cold outlet being intended for discharging air that has been cooled after having flowed along the dry channel;
each fluid junction connecting a dry channel and a wet channel is positioned at the cold outlet of the dry channel or between the air inlet and the cold outlet of the dry channel; and
each wet channel extends along the longitudinal axis, between the fluid junction and a wet outlet, the wet outlet being intended for discharging air that has been humidified after having flowed along the wet channel;
the device being characterized in that:
each wet channel comprises several wet outlets, distributed along a lateral axis, perpendicular to the longitudinal axis and to the transverse axis; and/or
each dry channel comprises several air inlets, distributed along a lateral axis, perpendicular to the longitudinal axis and to the transverse axis.

Distributed along the lateral axis means spatially distributed relative to the lateral axis, without necessarily being aligned along the lateral axis. According to one possibility, several wet outlets and/or several air inlets are aligned along the lateral axis.

According to one embodiment, each plate comprises a first slot, the first slots of the plates extending about a discharge axis, the discharge axis being secant with each plate.

According to one possible configuration:
two first slots, one formed respectively in each of two plates delimiting the one same wet channel, open into this channel;
the first slots, one formed respectively in each of two plates delimiting the one same dry channel, are connected to one another by a fluidtight passage that passes across the dry channel, so as to block off a passage of air in the dry channel; and
so that the air, having flowed along a wet channel, can be discharged successively through the fluidtight passages respectively formed, between two first slots, across various dry channels, a first slot, opening into the wet channel, forming the wet outlet of the wet channel.

At least one fluidtight passage across a dry channel may be formed of at least one seal extending between two first slots formed in the plates that delimit the dry channel.

According to one possibility, two plates that delimit a dry channel converge toward one another at their respective first slots, the fluidtight passage across the dry channel being formed by contact between the two plates around the first slots.

Advantageously, each plate comprises several first slots, distributed along the lateral axis, and potentially aligned along the lateral axis.

As a preference,
  at least one dry channel, or each dry channel, extends, between the air inlet and a fluid junction, along a thermal length; and
  the distance, along the lateral axis, between two adjacent first slots formed on the one same plate, is less than 50% of the thermal length, or than 40% of the thermal length, or than 30% of the thermal length.

Thermal length means the distance between the air inlet and the fluid junction, parallel to the longitudinal axis.

According to one embodiment:
  each plate comprises a second slot, the second slots of the plates extending about an intake axis, the intake axis being secant with each plate;
  the second slots, one formed respectively in each of two plates delimiting the one same dry channel, open into this channel;
  the second slots, one formed respectively in each of two plates delimiting the one same wet channel, are connected to one another by a fluidtight passage that passes across the wet channel, so as to block off a passage of air in the wet channel;
  a second slot, opening into a dry channel, forms an air inlet into the dry channel, and
  such that the air can be admitted to each dry channel, successively through the fluidtight passages respectively formed, between two second slots, across various wet channels.

According to one embodiment, at least one fluidtight passage across a wet channel is formed of at least one seal extending between two second slots formed in the plates that delimit the wet channel.

According to one embodiment, two plates that delimit a wet channel converge toward one another at their respective second slots, the fluidtight passage across the wet channel being formed by contact between the two plates around the second slots.

Advantageously, each plate comprises several second slots, distributed along the lateral axis, and potentially aligned along the lateral axis.

As a preference,
  at least one dry channel, or each dry channel, extends, between the air inlet and a fluid junction, along a thermal length; and
  the distance, along the lateral axis, between two adjacent second slots formed on the one same plate, is less than 50% of the thermal length, or than 40% of the thermal length, or than 30% of the thermal length.

According to one embodiment, the device comprises an auxiliary intake intended to admit air present in the room, the device being such that:
  each plate comprises a third slot, the third slots of the plates extending about an auxiliary axis, the auxiliary axis being secant with each plate;
  two third slots, one formed respectively in each of two plates delimiting the one same dry channel, open into this channel;
  the third slots, one formed respectively in each of two plates delimiting the one same wet channel, are connected to one another by a fluidtight passage that passes across the wet channel, so as to block off a passage of air in the wet channel;
  at least one third slot is connected to the auxiliary intake;
  each third slot of a plate opens, in a dry channel, between a second slot formed in that plate and the fluid junction; and
  such that the auxiliary air, coming from the room that is to be cooled, can be admitted, from the third slot, into each dry channel, successively through the fluidtight passages respectively formed between two third slots, across each wet channel, a third slot delimiting each dry channel forming an auxiliary air inlet into the dry channel.

According to one advantageous embodiment:
  each plate extends, along the longitudinal axis, between two longitudinal ends;
  each plate has a median zone situated at equal distances between the two longitudinal ends; and
  the stack is symmetrical with respect to a median plane, parallel to the transverse axis and passing through the median zone of several plates.

According to one embodiment:
  each plate extends, along the longitudinal axis, between two longitudinal ends;
  at least one dry channel extends, from an air inlet, toward two longitudinal ends, the air inlet being positioned between the longitudinal ends;
  the dry channel comprises, between the air inlet and each longitudinal end, or at each longitudinal end, a fluid junction with a wet channel; and
  the wet channel extends between each fluid junction and a wet outlet, the wet outlet being positioned between the fluid junctions.

According to this embodiment, in each dry channel, the air inlet opens into a median zone of each plate, equidistant, or substantially equidistant, from each longitudinal end.

According to one embodiment:
  each plate extends, along the longitudinal axis, between two longitudinal ends;
  at least one dry channel extends between two air inlets and a cold outlet, the cold outlet being situated between the air inlets of the dry channel;
  a fluid junction is arranged, between the dry channel and a wet channel adjacent to the dry channel, between the air inlets and the cold outlet; and
  at least one wet channel extends between the fluid junction and two wet outlets, the fluid junction being positioned between the two wet outlets.

The wet outlet may be positioned at the median zone of a plate that delimits the dry channel.

Each plate is made from a material comprising a polymer. The polymer-comprising material may extend from the dry face.

As a preference, the thickness of each plate is less than 2 mm or than 1 mm.

According to one embodiment:
  the device extends, along the lateral axis, between two lateral ends, forming a width;
  each dry channel extends, between the air inlet and the fluid junction, along a thermal length; and
  the width is at least a factor of 1.5 times greater than the thermal length.

According to one embodiment:
  the device extends, along the transverse axis, between two transverse ends, forming a height;

each dry channel extends, between the air inlet and the fluid junction, along a thermal length; and the height is at least a factor of 1.5 times greater than the thermal length.

Each wet face may be is connected to a water supply by a fluid or capillary connection.

Embodiments of the disclosure will be better understood on reading the description of the examples of embodiments that are presented, in the rest of the description, with reference to the figures listed below.

BRIEF SUMMARY OF THE DRAWINGS

FIGS. 5A and 5B represent one possible way of obtaining a fluidtight wall across a channel, between two openings.

FIGS. 5C and 5D represent another possible way of obtaining a fluidtight wall across a channel, between two openings.

DETAILED DESCRIPTION

Figure 1:
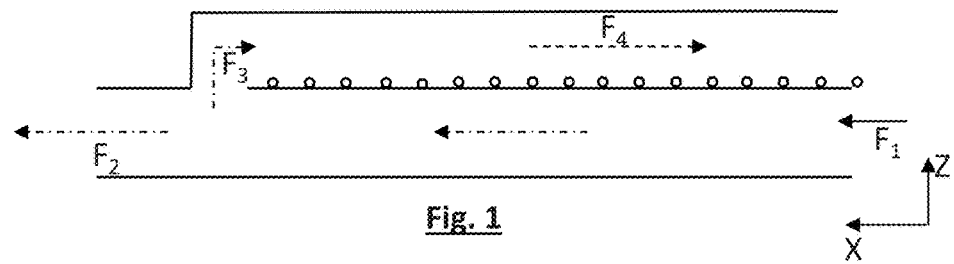
FIG. 1 depicts an operating diagram.

FIGS. 2A to 2E illustrate an example of a device according to the first embodiment of the disclosure. Whatever the embodiment, the device 1 comprises a stack of plates 10. The stack may comprise several tens or even several hundreds of plates, for example between thirty (30) plates and one-thousand (1,000) plates 10. The plates 10 are arranged parallel to one another, perpendicular to a transverse axis Z. Each plate 10 extends parallel to a plane $P_{XY}$. Each plate extends, parallel to a longitudinal axis X, over a length l and, parallel to a lateral axis Y, over a width L. The stack extends, parallel to the transverse axis Z, over a height h. The height h is dependent upon the number of plates.

The length l may be comprised between 5 cm and 1 m, and preferably between 10 cm and 30 cm. The length l is preferably:
  less than the width L, for example at least a factor of 1.5 times less, or even at least 2 times less or at least 3 times less than the width L; and/or
  less than the height h, for example, at least a factor of 1.5 times less, or even at least 2 times less or at least 3 times less than the height h.

Two adjacent plates 10 are spaced away from one another, parallel to the axis Z, by a distance preferably less than 2 cm, or even less than 1 cm or than 0.5 cm. The spacing between two adjacent plates may advantageously be comprised between 0.5 mm and 2 mm. The spacing between two adjacent plates has been exaggerated in FIG. 2A and in FIGS. 2B and 2D.

In the example depicted, each plate is flat. According to possible alternative forms, the plates may have corrugations, or have other types of structuring: ribs, fins.

Figure 2A:
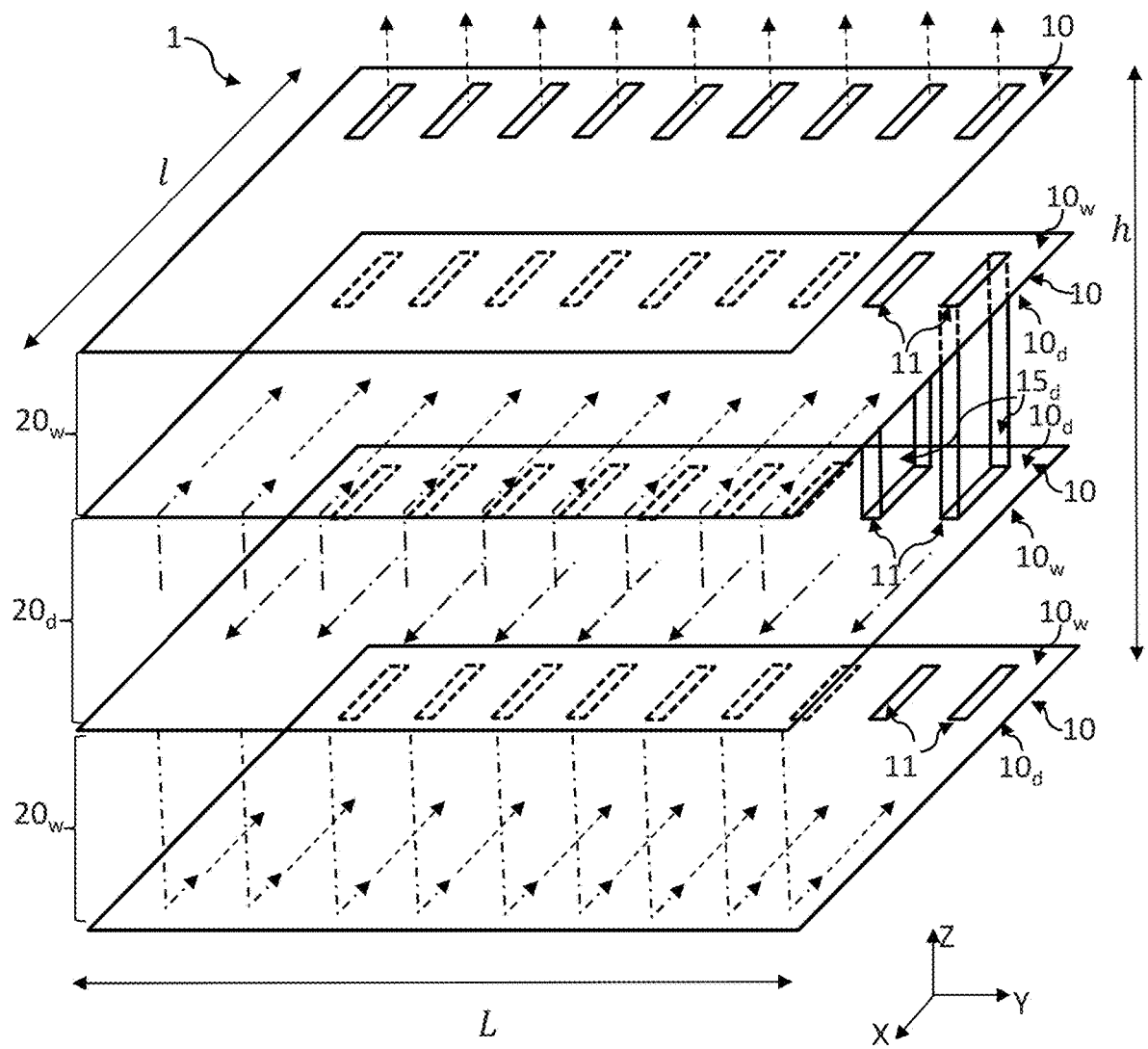
FIG. 2A depicts a three-dimensional schematic view of a first embodiment of the disclosure.
Figure 2B:
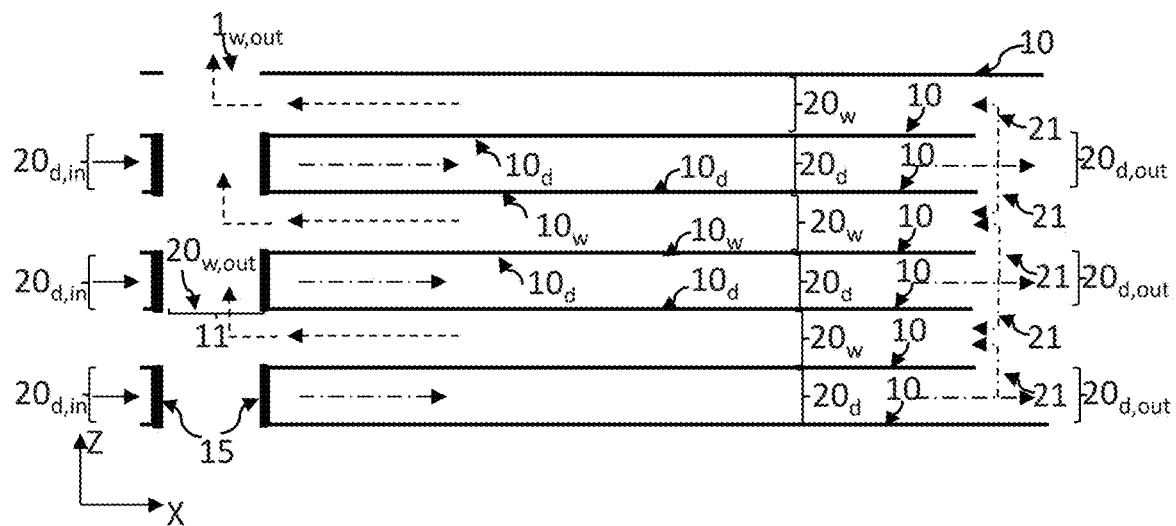
FIG. 2B is a view in cross section of the stack according to the first embodiment, on a plane of section A-A indicated in FIG. 2C and in FIG. 2E.
Figure 2C:
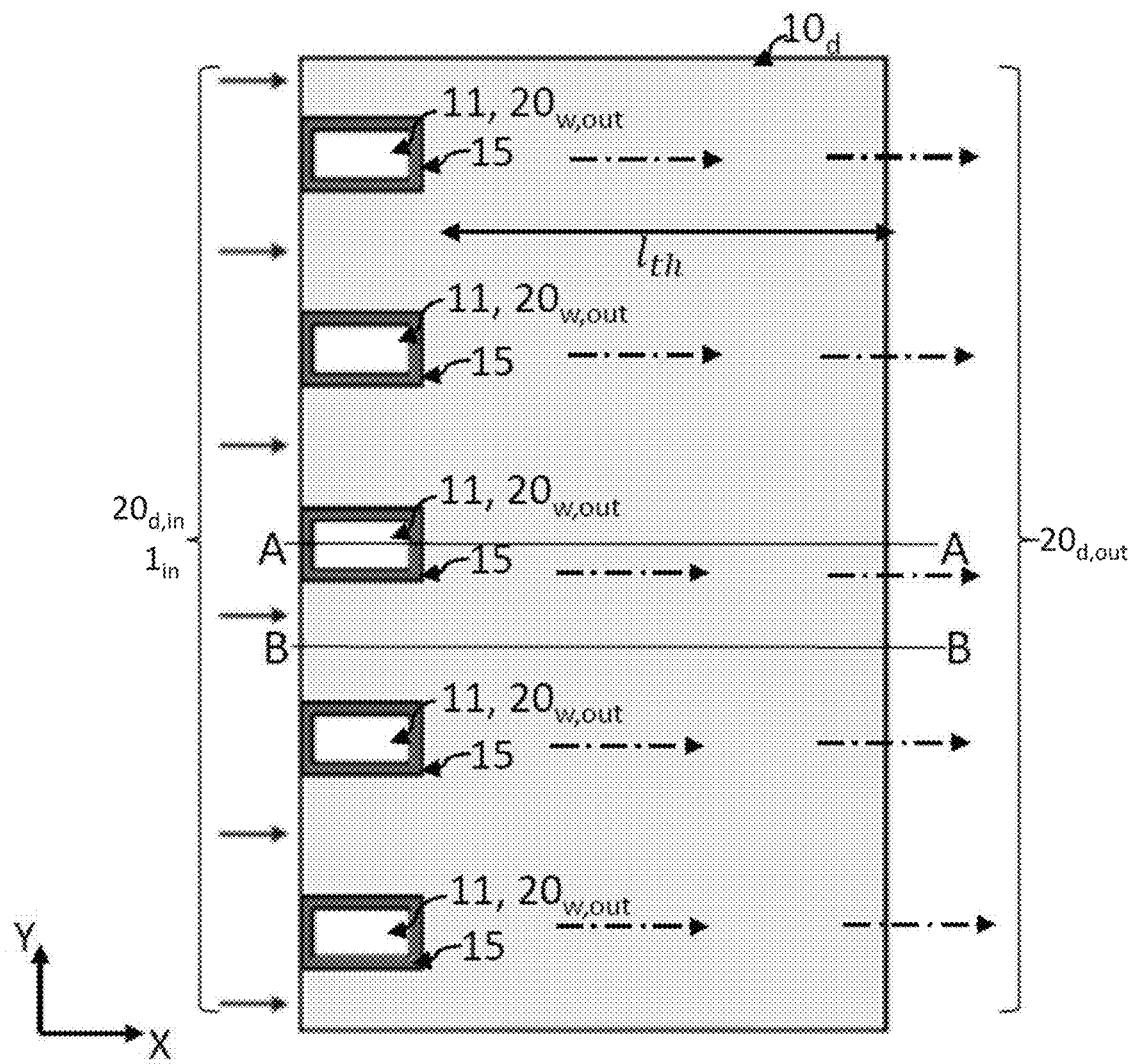
FIG. 2C is a view of a dry face of the stack according to the first embodiment.

The device 1 is intended to blow cooled air into a room. The air that is to be cooled is drawn into the device by a ventilation system, not depicted, through an intake $1_{in}$. The ventilation system comprises one or more fans. Depending on the configuration, the air that is to be cooled comes from outside the room and/or from inside the room. In this first example, the air is admitted parallel to the longitudinal axis X, as depicted in FIGS. 2A and 2C, in the form of solid-line arrows.

With the exception of the first and last plates that delimit the device along the transverse axis Z, each plate 10 comprises a wet face $10_w$, and a dry face $10_d$. The respective dry and wet faces of the one same plate are opposite faces in the sense that they are distant from one another by the thickness of the plate. The thickness of each plate, along the axis Z, is as small as possible, with due consideration to mechanical-strength constraints. The thickness is dependent upon the material from which the plate is formed. It is generally less than 1 cm, and advantageously less than 5 mm or even than 2 mm or than 1 mm. The thickness may be comprised between 10 µm and 1 mm, or even between 10 µm and 500 µm. Embodiments of the disclosure exploit the conduction of heat along the axis Z, through each plate 10.

A wet face $10_w$ is intended to be wetted with water as uniformly as possible. The water may be applied to the plate directly or indirectly, the plate having a water-soaked hydrophilic material at the wet face. This may be, for example, a material that allows water to be pumped in by capillary action from a water supply. The hydrophilic material may contain, for example, cellulose or a hydrophilic polymer. The wetting of a wet face may also be performed by fluid channels, formed along the length of the wet face and allowing water to be pumped in by capillary action from the water supply. In the description that follows, the term plate includes any capillary structure that may be formed in or placed on the plate.

The stack is such that the wet faces (or respectively the dry faces) of two consecutive plates face one another. Two wet faces $10_w$, facing one another and belonging to two adjacent plates, delimit a wet channel $20_w$. Two dry faces, facing one another and belonging to two adjacent plates, delimit a dry channel $20_d$. The dry or wet channels are delimited by two lateral uprights, not depicted, extending in an XZ plane. The lateral uprights are spaced apart by the width L of each plate, along the lateral axis Y.

Thus, the stack is formed of an alternation of dry channels $20_d$ and of wet channels $20_w$. Each dry channel extends, along the longitudinal axis X, between an air inlet $20_{d,in}$ and a cold outlet $20_{d,out}$. The cold outlet $20_{d,out}$ may be intended to be connected to a cooled-air discharge that is configured to blow the cooled air into the room.

Figure 2D:
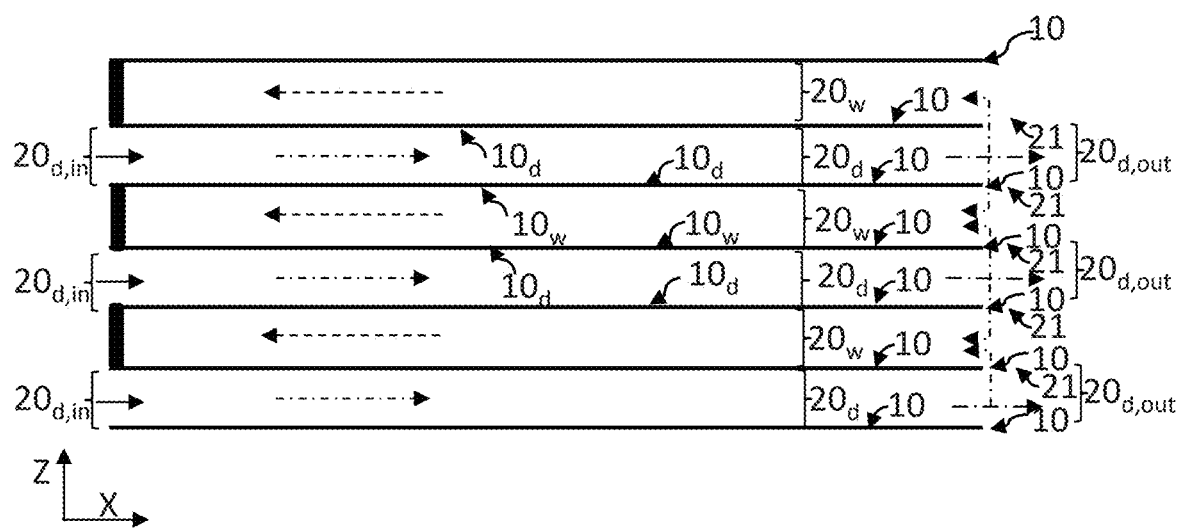
FIG. 2D is a view in cross section of the stack according to the first embodiment, on a plane of section B-B indicated in FIG. 2C and in FIG. 2E.
Figure 2E:
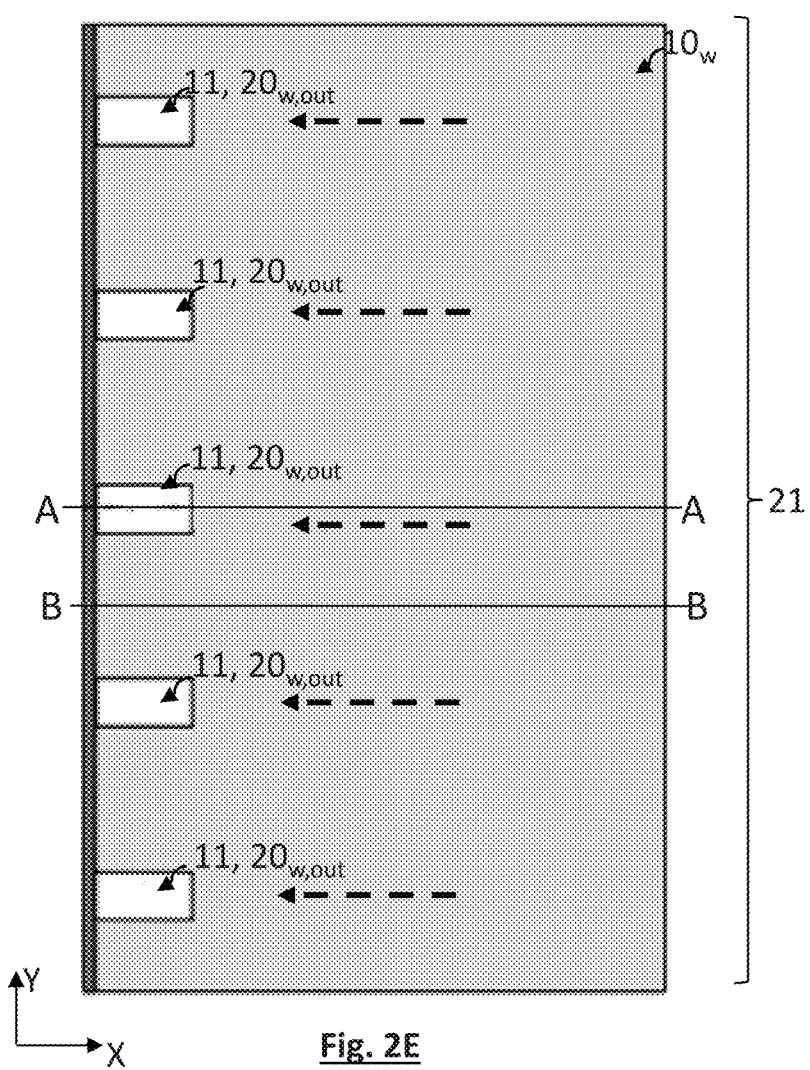
FIG. 2E is a view of a wet face of the stack according to the first embodiment.

FIGS. 2C and 2E respectively depict a dry face $10_d$ and a wet face $10_w$ of the one same plate 10. FIGS. 2B and 2D show a cross section through the stack in a plane XZ passing along the lines of section A-A and B-B depicted in FIGS. 2C and 2E.

In FIGS. 2A to 2E, as in the other figures appended to the description, solid-line, chain-line and broken-line arrows denote, respectively, air that is to be cooled, air in the process of being cooled, and air that is warming up and becoming humidified.

Each dry channel $20_d$ is connected to an adjacent wet channel $20_w$ by a fluid junction 21. Each wet channel $20_w$ extends, along the longitudinal axis X, between the fluid junction 21 and a wet outlet $20_{w,out}$. The fluid junction 21 is positioned between the air inlet $20_{d,in}$ and the cold outlet $20_{d,out}$, or at the cold outlet $20_{d,out}$. The fluid junction 21 is advantageously closer to the cold outlet $20_{d,out}$ than to the air inlet $20_{d,in}$. Thus, when considering the direction in which the air flows along the dry channel, the fluid junction 21 is positioned in the dry channel $20_d$, upstream of the cold outlet $20_{d,out}$ or at the cold outlet. The device 1 is such that, under the effect of the ventilation system, a fraction of the air flowing along a dry channel $20_d$ is admitted into a wet channel $20_w$ adjacent to it, through the fluid junction 21. The fluid junction 21 may be formed by a simple opening made in the plate that separates the wet channel from the dry channel. In the examples depicted, the fluid junction 21 is formed at a longitudinal edge (which is to say an edge perpendicular to the axis X) that forms one longitudinal end of the plate. A fraction of the cooled air is therefore drawn into at least one wet channel $20_w$ adjacent to the dry channel $20_d$, at the cold outlet $20_{d,out}$. The flow rate of the air flowing in the wet channel $20_w$ is adjusted by the ventilation system of the device. This is facilitated by the fact that the flow, in each dry channel, is preferably a laminar flow, the velocity of the air being, for example, comprised between 0.5 m·s$^{-1}$ and 3 m·s$^{-1}$.

The fluid junction 21, coupled to the ventilation system, may be such that 50% to 75% of the airflow flows toward the cold outlet $20_{d,out}$, whereas 25% to 50% of the airflow flows through the fluid junction toward the wet channel $20_w$. It should be noted that the flow of air through each wet channel $20_w$ is in the opposite direction to the flow of air in the dry channel adjacent to it. The device is thus configured for countercurrent operation.

As a preference, the distance, in the direction of air flow, in a dry channel $20_d$, between an air inlet $20_{d,in}$ and a fluid junction 21, is comprised between 5 cm and 1 m, preferably between 10 and 30 cm. Likewise, the distance, in the direction of air flow, in a wet channel $20_w$, between the fluid junction 21 and the wet (air) outlet $20_{w,out}$, is comprised between 5 cm and 1 m, preferably between 10 and 30 cm.

Each plate 10 comprises first slots 11, extending about a discharge axis parallel to the transverse axis Z. The first slots 11 are preferably positioned near the one same longitudinal edge of each plate. A longitudinal edge (or end) means one of the edges of the plate 10 along the longitudinal axis X. Near means at a distance preferably of less than 5 cm from an edge of the plate perpendicular to the longitudinal axis X. The first slots 11 are made closer to the air inlet $20_{d,in}$ than to the cold (air) outlet $20_{d,out}$. In the example depicted in FIGS. 2A to 2E, each first slot 11 may form a wet outlet $20_{w,out}$ of a wet channel $20_w$.

Two first slots 11, one formed respectively in each of two adjacent plates 10 delimiting the one same wet channel $20_w$, open into this channel. Thus, a wet channel $20_w$ is in fluidic communication with at least one first slot 11. Two first slots 11, one formed respectively in each of two adjacent plates delimiting the one same dry channel $20_d$, and which are aligned along the discharge axis, are connected to one another by a fluidtight wall 15 (also referred to herein as a fluidtight passage 15) extending across the dry channel and forming a passage. The fluidtight wall is tubular, about the discharge axis. In the example depicted in FIGS. 2A to 2E, the discharge axis is an axis parallel to the axis Z. The term "discharge axis" corresponds to the fact that the fluidtight passages 15 formed across each dry channel $20_d$ are intended to discharge the wet air flowing from each wet channel $20_w$. Two tubular fluidtight passages 15 forming a fluidtight passage across the dry channel $20_d$ have been depicted in FIG. 2A.

Each tubular fluidtight passage 15 passing across a dry channel 20d may be obtained by a seal, or by local protuberances formed in the plates, as described later on in connection with FIGS. 5A to 5D.

Thus, the air flowing downstream of each wet channel $20_w$ can be discharged through a first slot 11 opening into the wet channel, and then flow, along the discharge axis Z, alternately between each wet channel $20_w$ and each dry channel $20_d$, as far as a wet outlet of the device $1_{w,out}$ (see FIG. 2B) (which may also be referred to herein by "$1_{out,w}$").

A notable aspect of embodiments of the disclosure is that the first slots 11 are distributed along an axis that is parallel, or substantially parallel, to the lateral axis Y. What is meant by substantially parallel is parallel to within an angular tolerance of, for example, ±20°. In the example depicted, the first slots 11 are distributed uniformly parallel to the lateral axis Y.

Each first slot has a cross-sectional area of a few cm$^2$, for example of between 0.5 cm$^2$ and 30 cm$^2$, preferably between 1 cm$^2$ and 15 cm$^2$. The same is true of the second slots and third slots described hereinafter. Each slot may adopt an elongate shape, along the longitudinal axis X, for example a rectangular, oblong or lozenge shape.

The operation of the device 1 is now described, according to the principle mentioned in the prior art. The air that is to be cooled is admitted to the device via an intake 1in. It flows along the dry channels $20_d$, formed between the dry faces $10_d$ of adjacent plates, along the longitudinal axis X. Since the plates 10 are cooled by evaporation, the air is cooled by convection as it progressively flows in the direction of the longitudinal axis X. As the air cools, the absolute humidity of the air remains fixed, but its relative humidity increases, according to the principle of adiabatic cooling. The device may be dimensioned in such a way that the temperature of the air, at the cold outlet $20_{d,out}$ of each dry channel $20_d$, is of the order of the dew point temperature or substantially above the dew point temperature, to within a few degrees.

In each dry channel $20_d$, a fraction of the cooled air is withdrawn at the fluid junction 21 for re-admission into the wet channel $20_w$ adjacent to the dry channel. The wet channel $20_w$ is delimited by at least one wet plate $10_w$ (which may also be referred to herein as a wet face $10_w$), wetted with water. The air admitted into the wet channel flows along the longitudinal axis, between the fluid junction 21 and the wet outlet $20_{w,out}$ of the wet channel $20_w$. As it flows along the wet channel, the air becomes humidified, in contact with the water with which a wet face, or the two wet faces, delimiting the wet channel is wetted. The evaporation of the water as a result of the passage of the air along the wet channel $20_w$, causes the plate 10 to be cooled. The device thus forms an evaporator-exchanger: the vaporization of the water with which a wet face of a plate is wetted leads to cooling of the dry face of the plate, and this, through convection, allows cooling of the air circulating in the adjacent dry channel.

It is estimated that if the temperature of the intake air is comprised between 30° C. and 40° C., which corresponds to a commonplace scenario in temperate climates, the air temperature at the cold outlet may be below 20° C.

Aside from the countercurrent operation, another important aspect of the device 1 relies on the aspect ratio, which is to say on a ratio between the width L, along the lateral axis Y, and the length l, along the longitudinal axis X or on a ratio between the width L and the height h, along the transverse axis Z. For thermal-efficiency reasons, it is preferable for the thickness of each channel, along the transverse axis Z, to be small, preferably being less than 2 mm or less than 1 mm. As a result, the air flows along the dry or wet channels suffer a significant drop in pressure head. In order to be able to obtain a reasonable power of the ventilation system, while at the same time maintaining a sufficiently large exchange surface area, the shape of the device 1 is optimized so that the width L is greater than a length referred to as thermal length $l_{th}$, along which the exchange of heat between the air circulating in a wet channel $20_w$ and the air circulating in an adjacent dry channel $20_d$ occurs. The thermal length $l_{th}$ corresponds to the distance between the first slot 11 and the fluid junction 21 along the longitudinal axis X. To a first approximation, the thermal length may be considered to correspond to the length of the dry channel. It is preferable for the thermal length to be such that $l_{th} \leq \frac{2}{3}L$ or $l_{th} \leq \frac{1}{2}L$. A device 1 that is wider than it is long allows the creation of parallel counter-current air flows, over a short length.

In addition or as an alternative, it is preferable for the device to be taller than it is long. It is preferable for the thermal length to be such that $l_{th} \leq \frac{2}{3}h$ or $l_{th} \leq \frac{1}{2}h$. A device 1 that is taller than it is long allows countercurrent air flows to be "made parallel," over a short thermal length.

More generally, it is preferable for the thermal length $l_{th}$ to be less than the width L and/or than the height h. The thermal length $l_{th}$ is advantageously comprised between 5 cm and 1 m, and preferably comprised between 10 cm and 30 cm.

The fact that the first slots 11 are distributed along the lateral axis Y allows the air, in each wet channel $20_w$, to flow parallel to the flow of air in the dry channel $20_d$ adjacent to the wet channel. This makes it possible to maximize the operation of the device in a countercurrent configuration. This results in an improvement in the thermal efficiency of the device 1. The distance between two adjacent first slots 11, along the lateral axis Y, is preferably less than 50%, or even than 40% or even than 30% of the thermal length $l_{th}$.

FIGS. 3A to 3F depict a second embodiment. In the first embodiment, the air that is to be cooled enters each dry channel parallel to the longitudinal axis X. In the second embodiment, the air emerges into each dry channel by flowing parallel to the transverse axis Z.

Figure 3A:
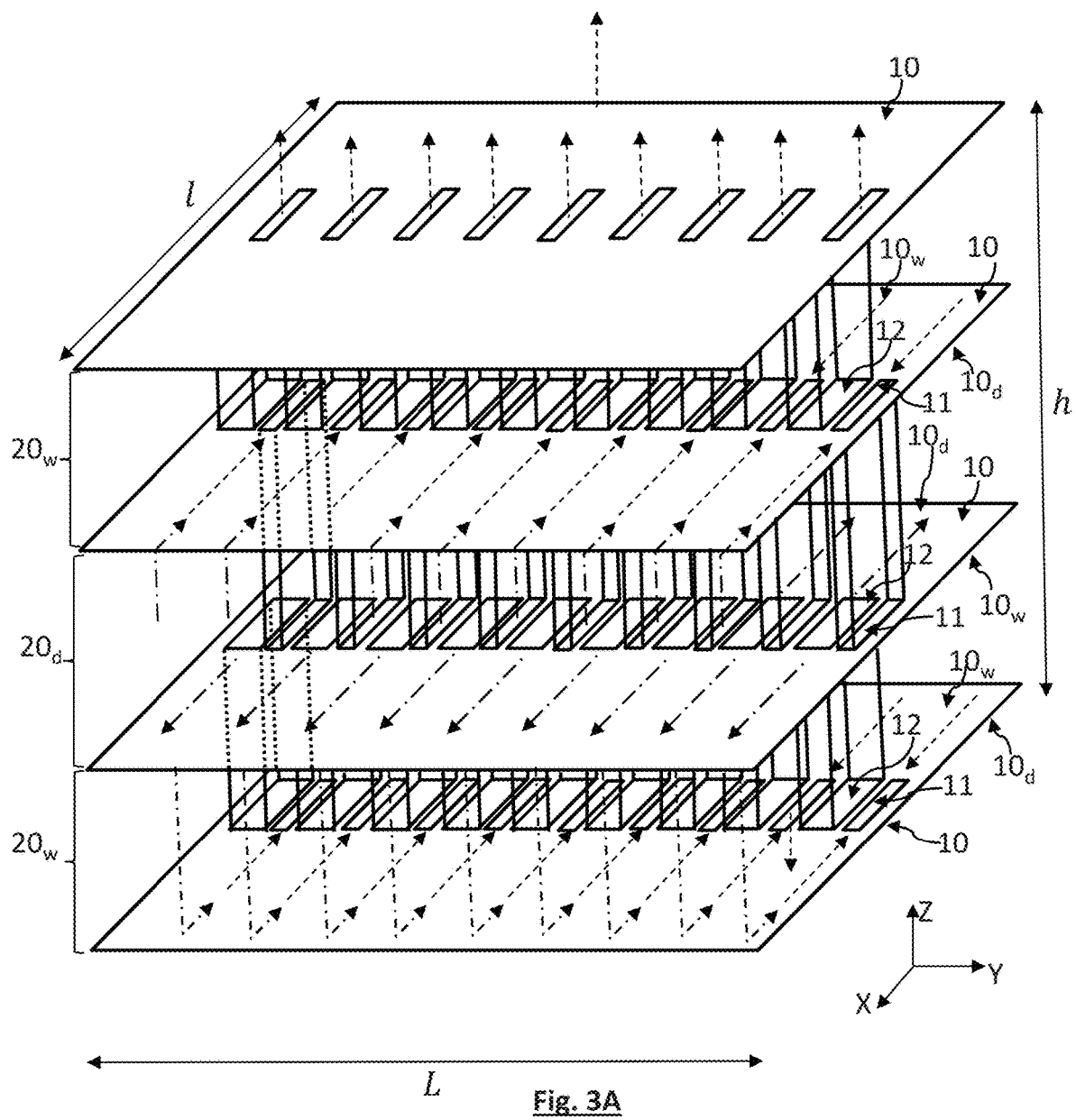
FIGS. 3A and 3B depict three-dimensional schematic views of a second embodiment of the disclosure.

In the second embodiment, each plate has second slots. Two second slots 12, one formed respectively in each of two adjacent plates 10 delimiting the one same dry channel $20_d$, open into this channel. Thus, a dry channel $20_d$ is in fluidic communication with at least one second slot 12. Two second slots 12, aligned along an intake axis and respectively formed one on each of two adjacent plates delimiting the one same wet channel $20_w$, are connected to one another by a fluidtight wall 16 (also referred to herein as a fluidtight passage 16) passing across the wet channel to form a fluidtight passage. The term "intake axis" corresponds to the fact that the air circulating through each fluidtight passage 16 is intended to be admitted to a dry channel $20_d$. The fluidtight passage 16 is tubular, about the intake axis. In the example depicted in FIGS. 3A to 3F, the intake axis is an axis parallel to the axis Z. Fluidtight passages 15 and 16, forming fluidtight passages across a dry channel $20_d$ and across two wet channels $20_w$, respectively, have been depicted in FIGS. 3A and 3B. In FIG. 3A, dotted lines on the left have been used to indicate two fluidtight passages 15 and 16.

Figure 3B:
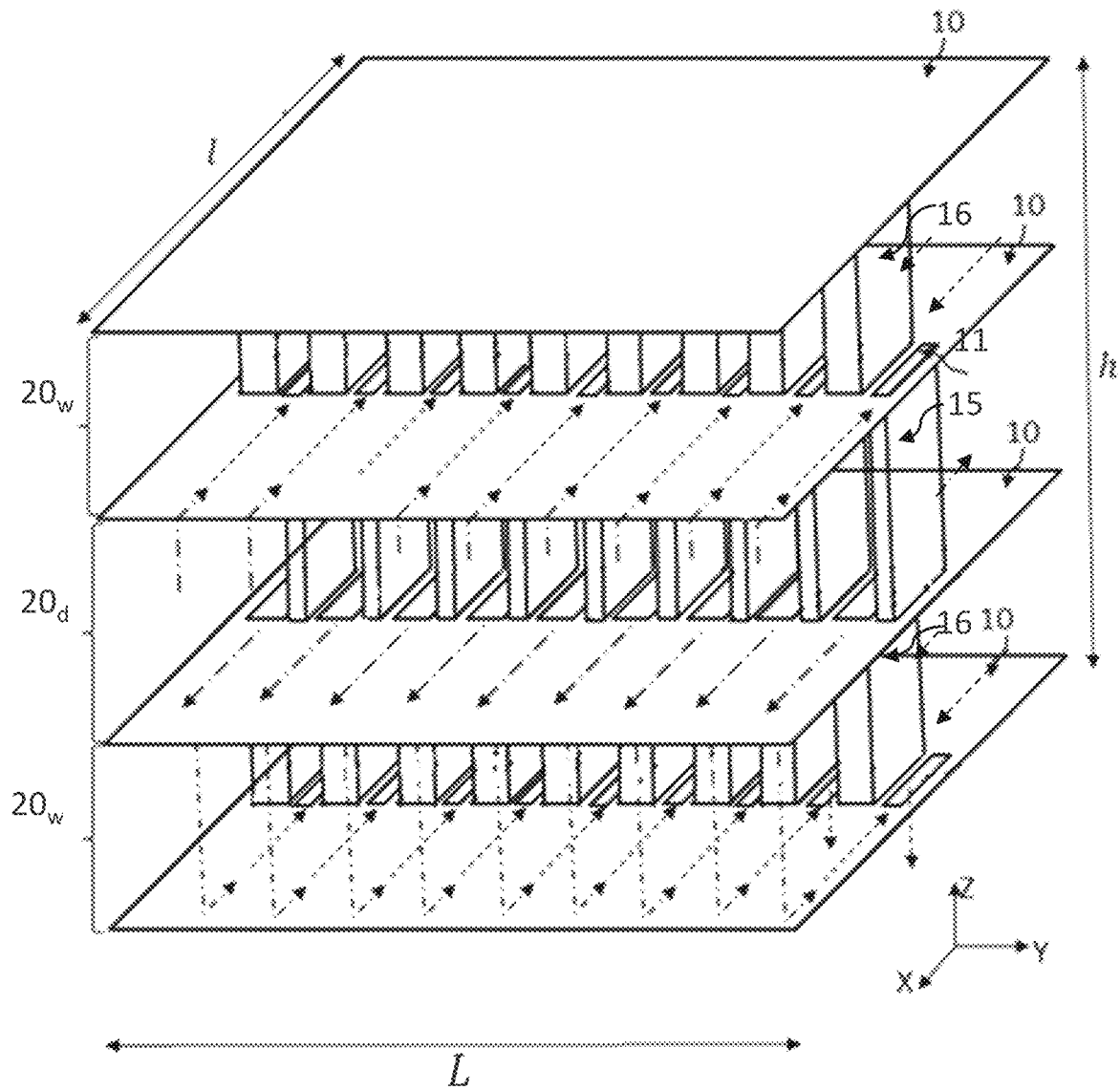

FIGS. 3A and 3B depict a top plate that delimits the stack along the transverse axis Z. The top plate comprises only first slots 11 since the humidified air coming from the wet channels is extracted via the top. The stack comprises a bottom plate, opposite to the top plate and delimiting the stack. The bottom plate may comprise only second slots, intended for admitting air that is to be cooled, since the air is admitted from the bottom. In other configurations, the air that is to be cooled is admitted through the top plate and the air coming from the wet channels is discharged through the top plate. In that instance, the top plate comprises first slots and second slots. The bottom plate may then be solid. According to one possibility, the air that is to be cooled is admitted both through the top plate and through the bottom plate: that makes it possible to reduce the routing of the air that is to be cooled through the stack. According to one possibility, the wet air, coming from the wet channels, is discharged both through the top plate and through the bottom plate: that makes it possible to reduce the routing of the wet air through the stack. The terms top plate and bottom plate refer to the plates that form the ends of the stack in the direction of the transverse axis Z.

In general, the top or bottom plates, which delimit the stack along the transverse axis, may or may not comprise first slots 11 and/or second slots 12, depending on the configuration for admitting the air that is to be cooled or for discharging wet air.

Each fluidtight passage 15, 16 may be obtained by a seal, or by local protuberances formed in the plates, as described later on in connection with FIGS. 5A to 5D.

Figure 3C:
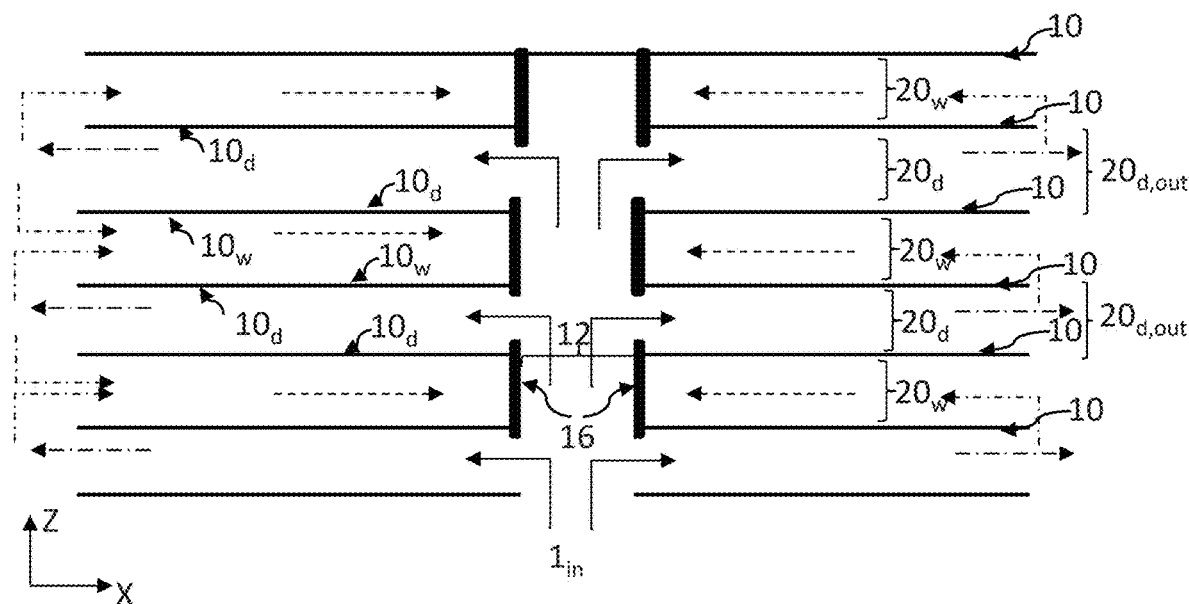
FIG. 3C is a view in cross section of the stack according to the second embodiment, on a plane of section A-A indicated in FIG. 3D and in FIG. 3F.
Figure 3D:
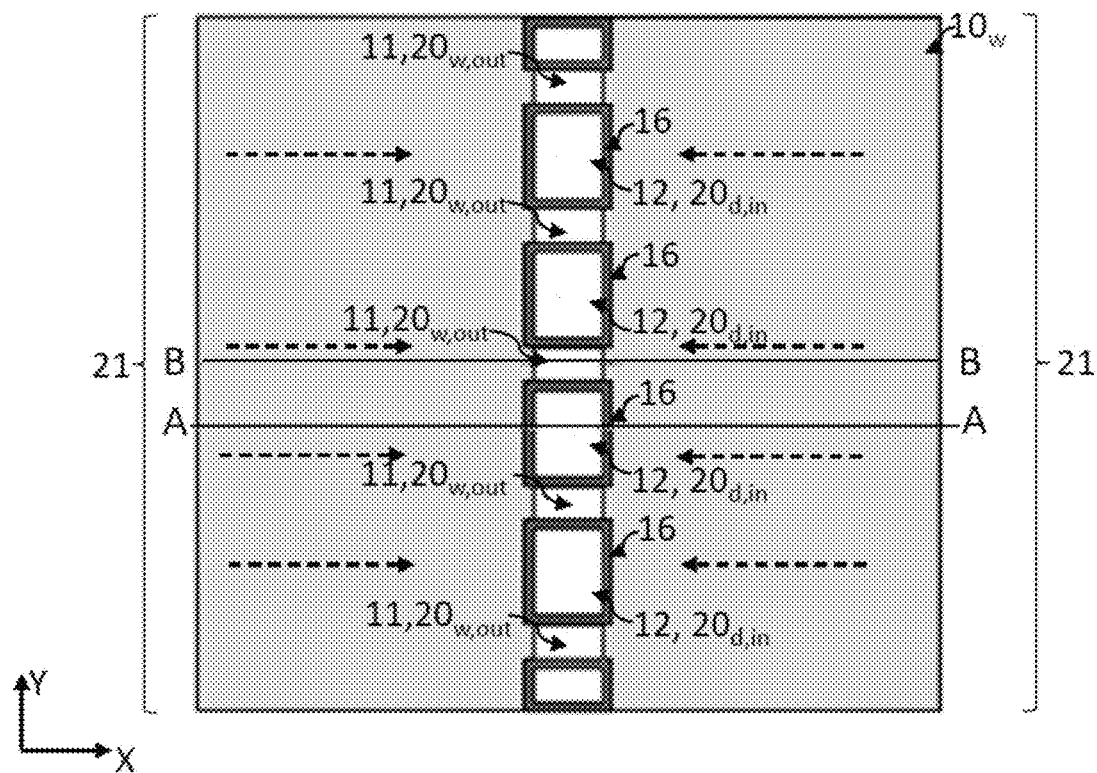
FIG. 3D is a view of a wet face of the stack according to the second embodiment.
Figure 3E:
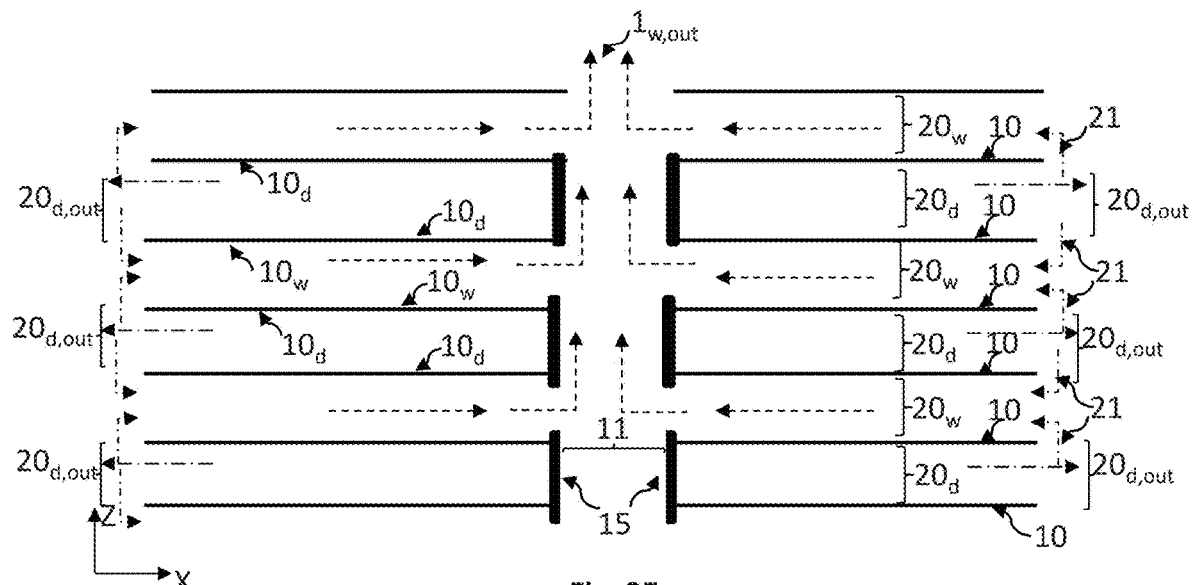
FIG. 3E is a view in cross section of the stack according to the second embodiment, on a plane of section B-B indicated in FIG. 3D and in FIG. 3F.
Figure 3F:
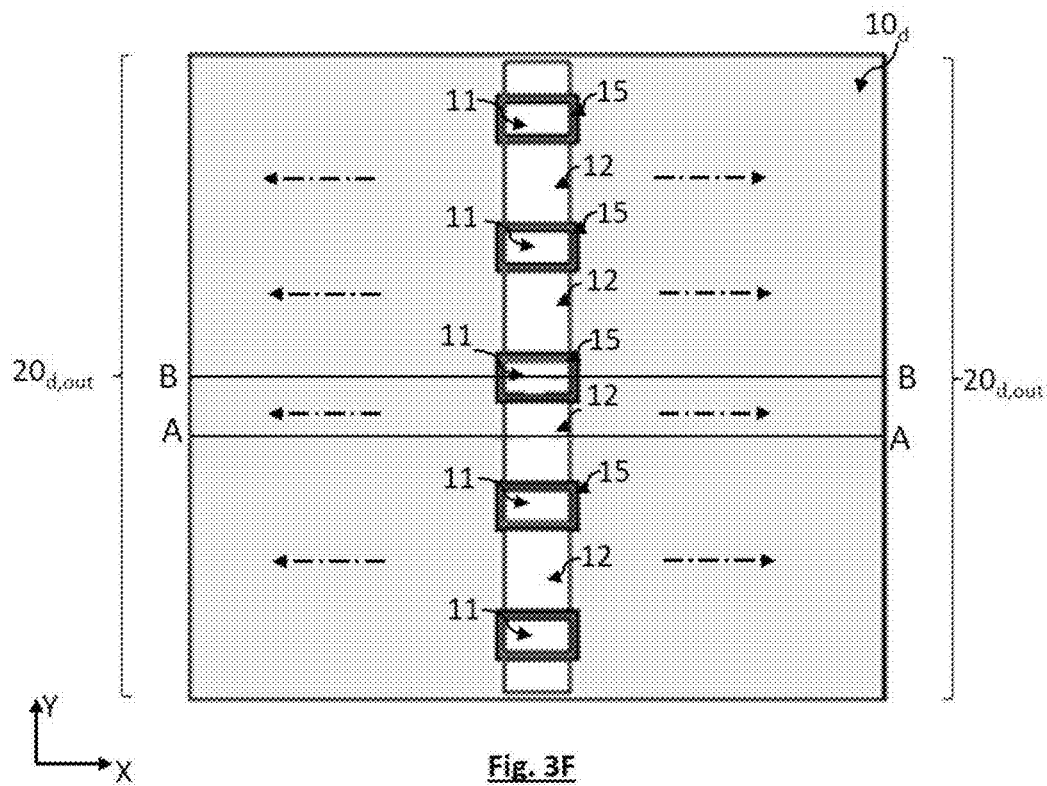
FIG. 3F is a view of a dry face of the stack according to the second embodiment.

FIGS. 3D and 3F respectively depict a wet face $10_w$ and a dry face $10_d$ of the one same plate 10. FIGS. 3C and 3E show a cross section through the stack in a plane XZ passing along the lines of section A-A and B-B depicted in FIGS. 3D and 3F. In each wet channel $20_w$, the wet air flows around the fluidtight passage 16. Likewise, in each dry channel, the air that is to be cooled flows around each fluidtight passage 15.

In this embodiment, the intake axis, along which the air that is to be cooled flows between the plates, upstream of a dry channel $20_d$, is parallel to the axis Z. The same is true of the discharge access along which the wet air flows between the plates, downstream of a wet channel $20_w$.

Just as the first slots 11 in each plate 10 are distributed along the lateral axis Y, as described in connection with the first embodiment, the second slots 12 are advantageously distributed along the lateral axis Y. The fact that the second slots 12 are distributed along the lateral axis Y allows the air, in each dry channel $20_d$, to flow parallel, or substantially parallel, to the longitudinal axis X and parallel to the flow of air in the wet channel $20_w$ adjacent to the dry channel. As described previously, this makes it possible to maximize the operation of the device in a countercurrent configuration.

This results in an improvement in the thermal efficiency of the device. The distance between two adjacent second slots, along the lateral axis Y, is preferably less than 50%, or even 40% or even 30% of the thermal length $l_{th}$.

According to the embodiment described in FIGS. 3A to 3F, the first and second slots are distributed parallel to the lateral axis Y, in a median zone of each plate. The term median zone refers to a zone situated equidistant, or substantially equidistant from the two longitudinal edges (or ends) of the plate. What is meant by substantially equidistant is equidistant to within a tolerance of ±10% or ±20%. A longitudinal edge means one of the edges of a given plate that are spaced apart along the longitudinal axis X.

Along the lateral axis Y, the first and second slots are aligned and alternate with one another. Aligning the first and second slots parallel to the lateral axis Y makes it possible to optimize the aforementioned thermal length. The thermal length $l_{th}$ therefore corresponds to the distance between each first slot 11 (or each second slot 12) and the fluid junction 21 along the longitudinal axis X.

Positioning the first and second slots in the median zone of each plate 10 allows the stack a symmetrical configuration with respect to a median plane parallel to the transverse axis Z and to the lateral axis Y, passing through the median zone of each plate. The median plane passes through the center of each slot and forms a plane of symmetry of the device. The ventilation system is configured such that the air that is to be cooled, emerging from each second slot 12, flows along each dry channel $20_d$ toward the respective two opposite longitudinal ends. Between the second slot 12 and each longitudinal end, a fluid junction 21 allows a fraction of the cooled air to be admitted into a wet channel $20_w$ adjacent to the dry channel. Thus, each dry channel comprises two fluid junctions 21 positioned one on each side of the median plane and preferably arranged symmetrically one relative to the other. The air admitted into the wet channel $20_w$ flows, from each fluid junction 21, toward the median plane.

The symmetrical arrangement of the second embodiment makes it possible to optimize the performance of the device in terms of compactness and efficiency. That makes it possible to limit the thermal length $l_{th}$, so as to limit the drop in pressure head while at the same time increasing the heat exchange surface area.

The symmetrical arrangement of the second embodiment makes it possible to obtain a configuration referred to as "massively parallel": The parallel layout of the flows, as mentioned in connection with the first embodiment, is "triple parallel" in the symmetrical configuration: along the axis Y and along the axis Z, but also along the axis X. Along the axis X, the cold air coming from a dry channel is blown in two opposite directions, parallel to the longitudinal axis X.

In FIG. 3D, it can be seen that the cross section of the first slots 11 is smaller than the cross section of the second slots 12. The ratio of the combined cross sections of the first slots to the combined cross sections of the second slots can be adjusted according to the ratio between the flow rate of air admitted to the dry channel and the flow rate of air admitted to the wet channel, downstream of each dry channel.

According to this embodiment, the air that is to be cooled, upstream of each dry channel and the wet air, downstream of each wet channel, flow parallel to the one same axis, in this instance the transverse axis, which is advantageous. This, for example, simplifies the interconnection of various devices, as will be described later on.

The term "second slot" does not imply that there will necessarily be a first slot. Thus, it is possible to envision a variant of the first embodiment in which each plate 10 has a second slot 12 without a first slot 11. The wet air emerges from each wet channel along the longitudinal axis, and the dry air is conveyed to each dry channel through a second slot 12.

In a variant, the cooled air is extracted from the center of the plate, while the intake or discharge axes are formed at an edge of the plate. In this variant:

each plate has a first slot 11 and a second slot 12 that are arranged near each longitudinal end;
the fluid junctions 21 between each dry channel $20_d$ and each wet channel $20_w$ are positioned between two second slots of the dry channel, preferably in the median part or substantially in the median part;
the air that is to be cooled flows, in each dry channel $20_d$, from a second slot 12 toward the median part of each plate 10, as far as a fluid junction 21;
the air flows, in each wet channel $20_w$, from a fluid junction 21 toward one longitudinal end of each plate 10, as far as a first slot 11, and
the cooled air coming from each dry channel is collected in the median part, through openings formed in each plate, and fluidtight passages formed across each wet channel. The cooled air is collected parallel to the transverse axis Z.

In such a variant, each dry channel extends between two air inlets and a cold outlet $20_{d,out}$, the cold outlet being situated between the air inlets of the dry channel, in the median zone. Each fluid junction 21 is arranged, between the dry channel and a wet channel $20_w$ adjacent to the dry channel, between the air inlets and the cold outlet of the dry channel. Each wet channel extends between the fluid junction 21 in the median part and two wet outlets, the fluid junction 21 being positioned between the two wet outlets.

Such a variant allows the device to be arranged symmetrically with respect to a median plane parallel to the transverse axis and passing through the median zone.

FIGS. 4A to 4D illustrate a third embodiment, which comprises features described in connection with the second embodiment. Unlike in the preceding embodiments, each plate comprises at least one third slot 13 intended to allow air that is to be cooled to be admitted into each dry channel $10_d$ (also referred to herein as a dry face $10_d$). This third embodiment is of relevance when the air intake $1_{in}$ is made up of air drawn in from outside the room. The device may comprise an auxiliary air intake $1_{aux}$, intended to admit air drawn from inside the room that is to be cooled. The device is configured in such a way that the auxiliary air is admitted, into each dry channel, downstream from the air coming from the air intake $1_{in}$, the latter intake then forming a main intake. Since the temperature in the room is assumed to be not as high as the temperature outside the room, it is sensible for the mixing of the air from outside and of the air from inside the room to be performed after the outside air has been partially cooled. The outside air is then considered to be comparable in temperature to the air in the room. Such mixing, performed inside the device, makes it possible to increase the energy and thermal efficiency in comparison with a configuration whereby the mixing of the air from inside the room and the air drawn in from outside the room is performed upstream of the dry channel.

Figure 4A:
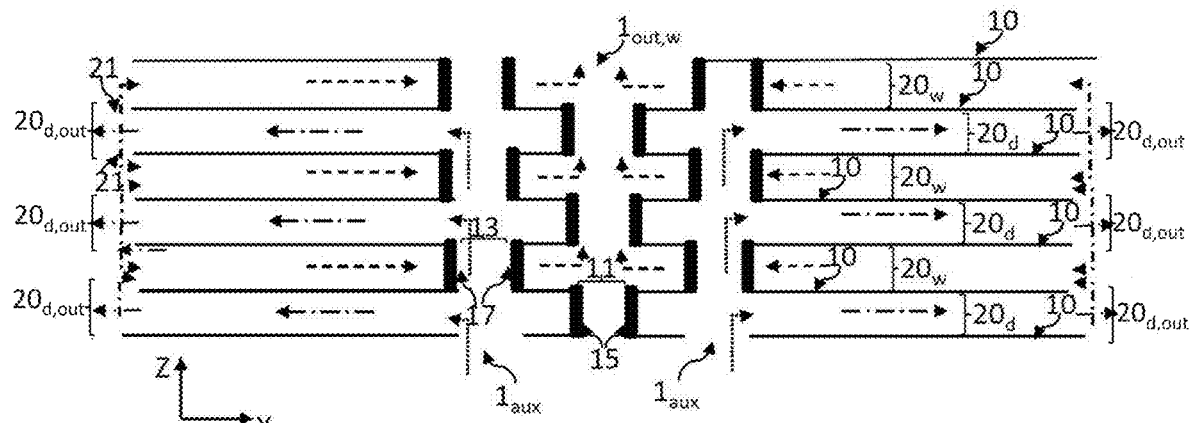
FIG. 4A is a view in cross section of the stack according to a third embodiment, on a plane of section A-A indicated in FIG. 4B and in FIG. 4D.

In order to allow air to be admitted into various dry channels, two third slots 13 one formed respectively in each of two adjacent plates delimiting the one same dry channel open into the channel. Thus, a dry channel $20_d$ is in fluidic communication with at least one third slot 13. Two third slots 13, aligned along an auxiliary intake axis and respectively formed one on each of two adjacent plates delimiting the one same wet channel $20_w$, are connected to one another by a fluidtight wall 17 (which may also be referred to herein as a fluidtight passage 17 and/or as an auxiliary fluidtight passage 17) passing across the wet channel to form a fluidtight passage. The fluidtight passage 17 is tubular, about the auxiliary intake axis. In the example depicted in FIGS. 4A to 4D, the auxiliary intake axis is an axis parallel to the axis Z. In FIG. 4A, the auxiliary air is indicated in dotted line.

The term "auxiliary intake axis" corresponds to the fact that the auxiliary air is admitted, into a dry channel, by flowing along the auxiliary intake axis, through one or more fluidtight walls that extend across a wet channel.

Just like the passages 15 and 16 previously described, each tubular, fluidtight passage 17 may be obtained by a seal, or by local protuberances formed in the plates, as described later on in connection with FIGS. 5A to 5D.

Each third slot 13 is positioned, on each plate, in such a way as to open out between the second slot 12 and the fluid junction 21. The third slot 13 is preferably positioned closer to the second slot 12 (which forms the main air intake) than to the fluid junction 21. If the thermal length $l_{th}$ denotes the distance, along the longitudinal axis, between the second slot 12 and the fluid junction 21, the distance between the first slot 13 and the second slot 12 of the one same plate may be comprised between 10% and 50% of the thermal length $l_{th}$, and advantageously between 15% and 30% of the thermal length $l_{th}$.

Figure 4B:
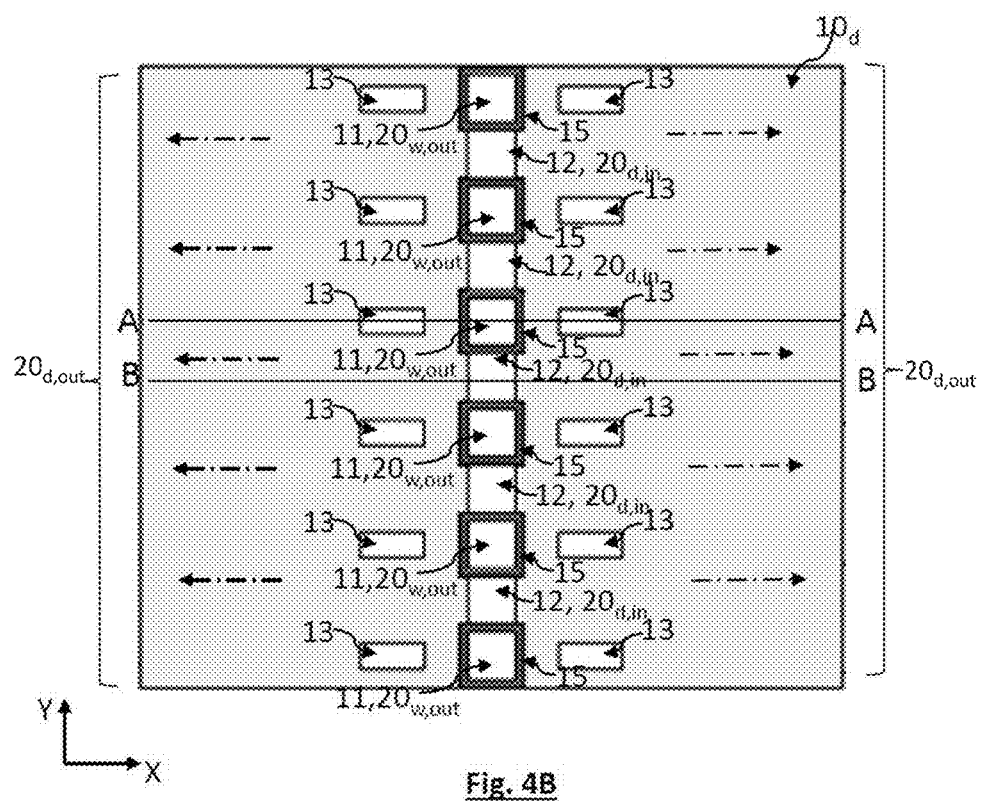
FIG. 4B is a view of a dry face of the stack according to the third embodiment.
Figure 4C:
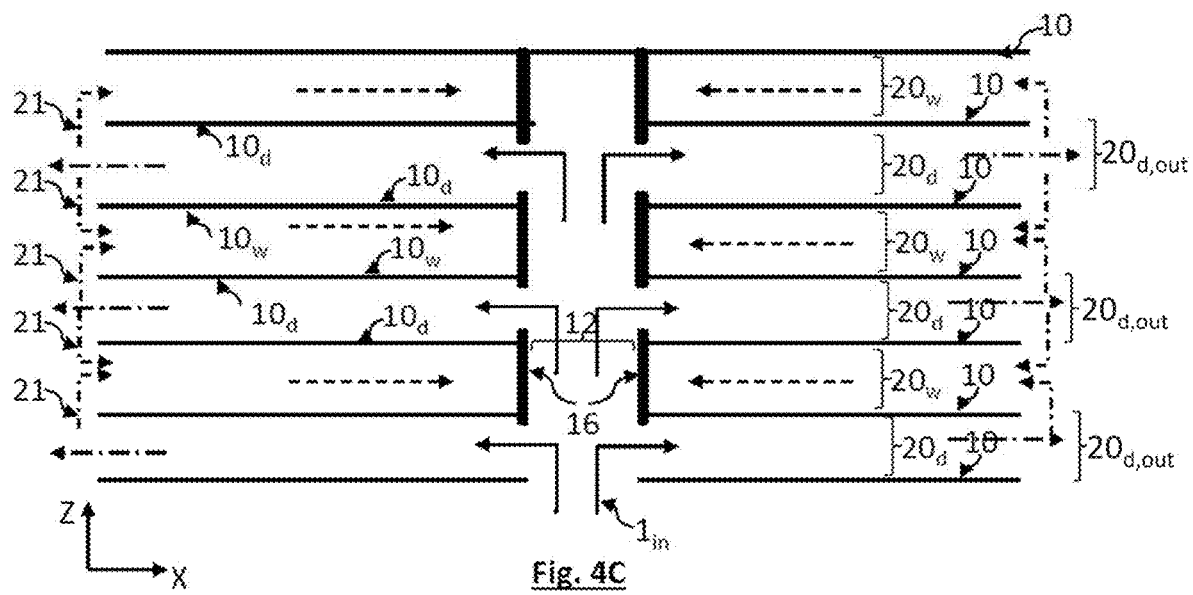
FIG. 4C is a view in cross section of the stack according to the third embodiment, on a plane of section B-B indicated in FIG. 4B and in FIG. 4D.
Figure 4D:
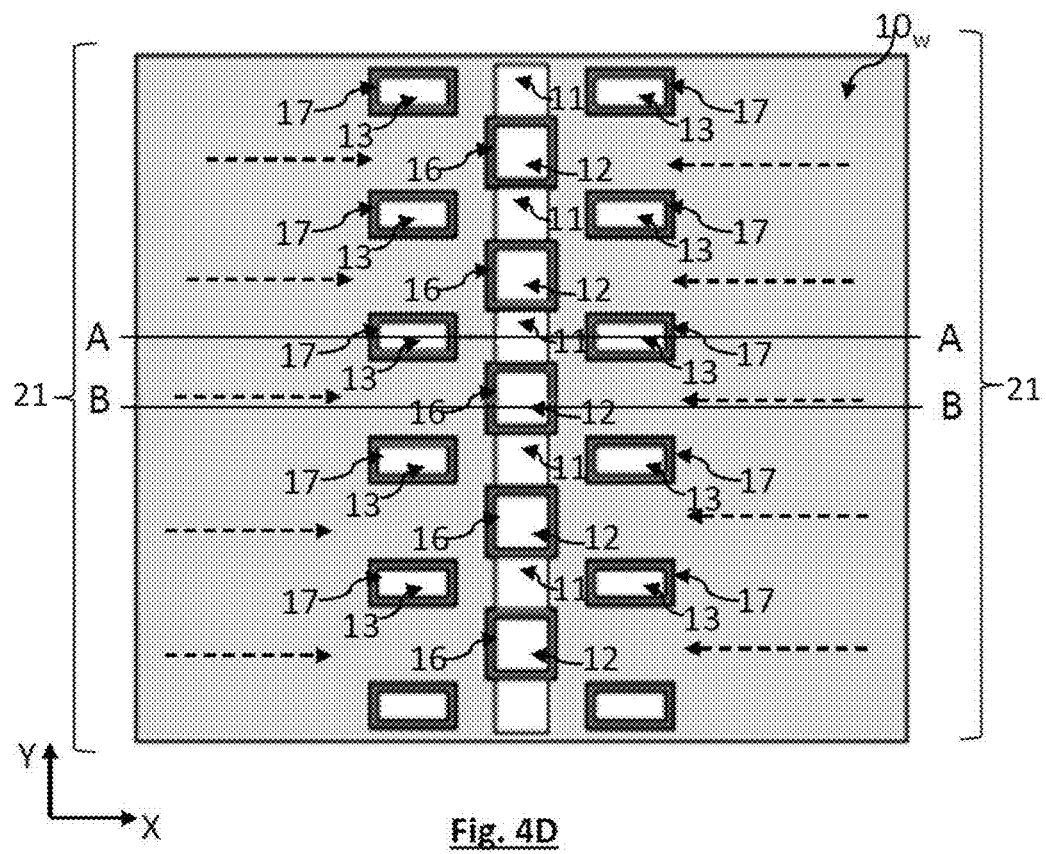
FIG. 4D is a view of a wet face of the stack according to the third embodiment.

FIGS. 4B and 4D respectively depict a dry face $10_d$ and a wet face $10_w$ of the one same plate 10. FIGS. 4A and 4C show a cross section through the stack in a plane XZ passing along the lines of section A-A and B-B depicted in FIGS. 4B and 4D.

Recourse to an auxiliary air intake makes it possible to adjust the balance of pressure in the room that is to be cooled. This notably makes it possible to avoid an overpressure in the room, under the effect of the cooled air blown in by the device, particularly when the air that forms the intake $1_{in}$ is drawn in from outside. The auxiliary supply makes it possible to reduce any overpressure by drawing air in from inside the room. That makes it possible to avoid potential disruption to the operation of installations of centralized ventilation type with which the room that is to be cooled is equipped. Moreover, if the room that is to be cooled becomes overpressurized, then a fraction of the air, cooled by the device, will have to be discharged to outside the room, and this is not optimal.

Whatever the embodiment, the cooled air coming from each dry channel is advantageously collected, from each cold outlet $20_{d,out}$, by an air manifold before being blown into the room.

Although it has been described in connection with FIGS. 4A to 4D in a symmetrical configuration, the auxiliary air intake may be combined with an asymmetric embodiment, for example the first embodiment.

FIGS. 5A to 5D illustrate the creation of fluidtight walls between slots, formed facing one another, on two successive plates. These may be, for example, the first slots 11, the second slots 12 and the third slots 13 described hereinabove. According to a first possibility, each mutually-facing slot is surrounded by a seal. The compression of two seals one associated respectively with each of two slots positioned facing one another forms a fluidtight tubular wall. This possibility is illustrated in FIGS. 5A and 5B. In a variant, a single seal may connect two opposing slots.

Another possibility, that avoids or limits recourse to seals, consists in locally deforming the plates 10 in the region of the slots so that contact between the two plates creates a fluidtight passage between the two slots. This possibility is illustrated in FIGS. 5C and 5D. The plates may be, for example, formed in such a way that they converge toward one another until they come into contact with one another around each slot. This type of shape may be obtained whether the material is metallic or nonmetallic. When the material is nonmetallic, for example of polymer type, the plates may be thermoformed or molded to achieve the desired shape.

For forming the plates, there are various metallic materials that can be envisioned, for example aluminum or copper. However, in order to limit the weight of the device and the cost of manufacture, the plates may be formed in polymer. Polymers generally have thermal conduction properties that are not as good as those of certain metals. However, the device 1 essentially assumes that the thermal conduction takes place through the thickness of the plate 10, this thickness preferably being less than 2 mm or than 1 mm. This small thickness makes it possible to resort to polymer-based plates since the small thickness between the wet face $10_w$ and the dry face $10_d$ compensates for the low thermal conductivity. The low thermal conductivity of a polymer may also constitute an advantage as it limits the conduction of heat along the longitudinal axis X. This may make it possible to avoid the overheating of a plate as a result of the heat of the air that is to be cooled entering a dry channel, and spreading by thermal conduction through the plate along the longitudinal axis. The polymer may thus extend from the dry face. It may extend as far as the wet face or may be covered with a capillary structure or material that encourages the wetting of the wet face.

Recourse to polymer materials also makes it possible to significantly reduce the mass of the device. It also allows plates to be formed by thermoforming, as described in connection with FIGS. 5C and 5D.

According to one embodiment, the dry faces may have fins, forming protuberances, and increasing the surface area for exchange between the dry face and the air that is to be cooled. The same is true of the wet face.

Whatever the embodiment, the device may be arranged as modules, each module comprising a determined number of plates. The fact that the air that is to be cooled and the humidified air flow along the transverse axis Z is favorable to interconnections between identical modules. Concatenating modules allows the power of the device to be adjusted. An intermediate manifold, collecting the air that is to be cooled, upstream of a dry channel, and collecting the wet air, downstream of a wet channel, may be positioned between the two modules. The modular layout is easier in configurations whereby the air that is to be cooled, the wet air coming from the wet channels and any auxiliary air there might be flow parallel to the transverse axis Z.

Whatever the embodiment, the supply of water to each wet face may be achieved by using a fixed reservoir, connected to each wet face by a fluidic or capillary connection. The water may reach each wet face by pumping or by gravity flow.

Whatever the embodiment, spacers, not depicted in the attached figures, may be fitted in order to keep the spacing between two adjacent plates as constant as possible.

The invention claimed is:

1. An indirect evaporative cooling air-conditioning device, the device being configured to blow cooled air into a room, the device comprising:
   an air intake, configured to collect air that is to be cooled;
   plates, forming a stack, each plate having a dry face opposite to a wet face, the wet face of each plate being configured to be wetted with water, each plate being configured to be cooled under the effect of evaporation of water from the wet face;
   a ventilation system;
   wherein:
      two adjacent plates are spaced away from one another, along a transverse axis so as to form a channel, the channel being:
         either a dry channel, delimited by two dry faces of two adjacent plates,
         or a wet channel, delimited by two wet faces of two adjacent plates;
      the plates are arranged so as to form an alternation of dry channels and wet channels, each dry channel being adjacent to a wet channel, two adjacent channels, respectively one dry and one wet, being connected by a fluid junction;
      each dry channel extends, along a longitudinal axis, between an air inlet, connected to the air intake, and a cold outlet, the cold outlet being configured to discharge air that has been cooled after having flowed along the dry channel;
      each fluid junction connecting a dry channel and a wet channel is positioned at the cold outlet of the dry channel or between the air inlet and the cold outlet of the dry channel;
      each wet channel extends along the longitudinal axis, between the fluid junction and a wet outlet, the wet outlet being configured to discharge air that has been humidified after having flowed along the wet channel;
   wherein:
      each wet channel comprises several wet outlets, distributed along a lateral axis, perpendicular to the longitudinal axis and to the transverse axis;
      and/or each dry channel comprises several air inlets, distributed along a lateral axis, perpendicular to the longitudinal axis and to the transverse axis.

2. The device of claim 1, wherein:
   each plate comprises several first slots opening into a wet channel and forming wet outlets of the wet channel, first slots of different plates extending about a discharge axis, the discharge axis being secant with each plate;
   two first slots, one formed respectively in each of two plates delimiting the one same wet channel, open into this channel;
   the first slots, one formed respectively in each of two plates delimiting the one same dry channel, are connected to one another by a fluidtight passage that passes across said dry channel, so as to block off a passage of air in the dry channel;
   so that the air, having flowed along a wet channel, is discharged successively through the fluidtight passages respectively formed, between two first slots, across various dry channels.

3. The device of claim 2, wherein at least one fluidtight passage across a dry channel is formed of at least one seal extending between two first slots formed in the plates that delimit the said dry channel.

4. The device of claim 2, wherein two plates that delimit a dry channel converge toward one another at their respective first slots, the fluidtight passage across the dry channel being formed by contact between the two plates around the first slots.

5. The device of claim 2, wherein each plate comprises several first slots distributed along the lateral axis.

6. The device of claim 5, wherein:
   each dry channel extends, between the air inlet and one of said fluid junctions, along a thermal length;
   the distance, along the lateral axis, between two adjacent first slots formed on the one same plate, is less than 50% of the thermal length.

7. The device of claim 1, wherein:
   each plate comprises a second slot, the second slots of the plates extending about an intake axis, the intake axis being secant with each plate;
   the second slots, one formed respectively in each of two plates delimiting the one same dry channel, open into said dry channel;
   the second slots, one formed respectively in each of two plates delimiting the one same wet channel, are connected to one another by a fluidtight passage that passes across said wet channel, so as to block off a passage of air in the wet channel;
   each second slot, opening into a dry channel, forms an air inlet into said dry channel;
   so that the air can be admitted to each dry channel, successively through the fluidtight passages respectively formed, between two second slots, across various wet channels.

8. The device of claim 7, wherein at least one fluidtight passage across a wet channel is formed of at least one seal extending between two second slots formed in the plates that delimit the said wet channel.

9. The device of claim 7, wherein two plates that delimit a wet channel, converge toward one another at their respective second slots, the fluidtight passage across the wet channel being formed by contact between the two plates around the second slots.

10. The device of claim 7, wherein each plate comprises several second slots distributed along the lateral axis.

11. The device of claim 10, wherein:
   each dry channel extends, between the air inlet and one of said fluid junctions, along a thermal length;
   the distance, along the lateral axis, between two adjacent second slots formed on the one same plate, is less than 50% of the thermal length.

12. The device of claim 7, wherein the device comprises an auxiliary intake configured to admit auxiliary air, present in the room, wherein:
   each plate comprises a third slot, the third slots of the plates extending about an auxiliary axis, the auxiliary axis being secant with each plate;
   two third slots, one formed respectively in each of two plates delimiting one same dry channel of said dry channels, open into said one same dry channel;
   the third slots, one formed respectively in each of two plates delimiting the one same wet channel of said wet channels, are connected to one another by an auxiliary fluidtight passage that passes across said one same wet channel, so as to block off a passage of air in said one same wet channel;
   at least one third slot is connected to the auxiliary intake;
   each third slot of a plate opens, into said one same dry channel, between a second slot formed in that plate and the fluid junction;
   so that auxiliary air, can be admitted, from the third slot, into each dry channel, successively through the auxiliary fluidtight passages respectively formed between two third slots, across each wet channel, each third slot opening into said dry channel forming an auxiliary air inlet into said dry channel.

13. The device of claim 1, wherein:

each plate extends, along the longitudinal axis, between two longitudinal ends;

each plate has a median zone situated at equal distances between the two longitudinal ends;

the stack is symmetrical with respect to a median plane, parallel to the transverse axis and passing through the median zone of several plates.

14. The device of claim 1, wherein:

each plate extends, along the longitudinal axis, between two longitudinal ends;

at least one dry channel extends, from an air inlet, toward two longitudinal ends, the air inlet being positioned between the longitudinal ends;

the dry channel comprises, between the air inlet and each longitudinal end, or at each longitudinal end, a fluid junction with a wet channel;

the wet channel extends between each fluid junction and a wet outlet, the wet outlet being positioned between the fluid junctions.

15. The device of claim 14, wherein, in each dry channel, the air inlet opens into a median zone of each plate, equidistant from each longitudinal end.

16. The device of claim 1, wherein:

each plate extends, along the longitudinal axis, between two longitudinal ends;

at least one dry channel extends between two air inlets and a cold outlet, the cold outlet being situated between the air inlets of the dry channel;

the fluid junction is arranged between the dry channel and one of said wet channels adjacent to the dry channel, between the air inlets and the cold outlet, or at the cold outlet;

at least one wet channel extends between the fluid junction and two wet outlets, the fluid junction being positioned between the two wet outlets.

17. The device of claim 1, wherein each plate is made from a material comprising a polymer.

18. The device of claim 1, wherein the thickness of each plate is less than 2 mm or than 1 mm.

19. The device of claim 1, wherein:

the device extends, along the lateral axis, between two lateral ends, forming a width;

each dry channel extends, between the air inlet and the fluid junction, along a thermal length;

the width is at least a factor of 1.5 times greater than the thermal length.

20. The device of claim 1, wherein:

the device extends, along the transverse axis, between two transverse ends, forming a height;

each dry channel extends, between the air inlet and the fluid junction, along a thermal length;

the height is at least a factor of 1.5 times greater than the thermal length.

* * * * *